United States Patent [19]

Del Rio

[11] 3,865,488

[45] Feb. 11, 1975

[54] FINGERPRINT DISPLAY SYSTEM UTILIZING A STORED FINGERPRINT

[75] Inventor: Eddy Humberto Del Rio, Palm Beach, Fla.

[73] Assignee: RCA Corporation, New York, N.Y.

[22] Filed: Nov. 30, 1973

[21] Appl. No.: 420,667

[52] U.S. Cl. .......................... 356/71, 340/146.3 E
[51] Int. Cl. .......................... G06k 9/08
[58] Field of Search .............. 356/71; 340/146.3 E; 117/.5

[56] References Cited

UNITED STATES PATENTS

| | | | |
|---|---|---|---|
| 2,020,376 | 11/1935 | Rich | 356/71 |
| 3,174,414 | 3/1965 | Myer | 356/71 |
| 3,619,060 | 11/1971 | Johnson | 356/71 |

*Primary Examiner*—Vincent P. McGraw
*Attorney, Agent, or Firm*—E. J. Norton; R. E. Smiley

[57] ABSTRACT

A ridge pattern, for example, a fingerprint, to be visually displayed, is applied to a material which stores the ridge pattern. The material is then placed under an edge illuminated glass plate. Where the ridges of the material make contact with one side of the plate, bright illumination appears on another side of the plate. All other areas appear dark allowing the fingerprint stored on the material to be visually observed or photographed.

9 Claims, 3 Drawing Figures

PATENTED FEB 11 1975 3,865,488

FINGERPRINT DISPLAY SYSTEM UTILIZING A STORED FINGERPRINT

BACKGROUND OF THE INVENTION

A number of systems are available for optically displaying a fingerprint of an individual utilizing an illuminated prism against which the finger is pressed. The fingerprint may then be visually observed or photographed. This is, in one sense, an improvement over the conventional method of inking the finger then placing it on a paper to be recorded, in that the finger is not dirtied by the inking process. However, if the fingerprint is to be observed for any length of time, the person whose fingerprint is to be observed may tire of holding the finger motionless on the prism.

SUMMARY OF THE INVENTION

Apparatus for optically displaying a ridge pattern includes a member of transparent material of the type which substantially internally reflects, between adjacent surfaces, light energy applied thereto, means having stored thereon a raised ridge pattern to be displayed and a means for applying light energy to the member. The means having the raised ridge pattern is placed with the ridges in contact with one of the adjacent surfaces. The presence of the ridges in contact with the one surface causes light energy to be reflected externally of the member at points on a second surface determined according to the location of the ridges on the one surface.

DETAILED DESCRIPTION

Figure 1:
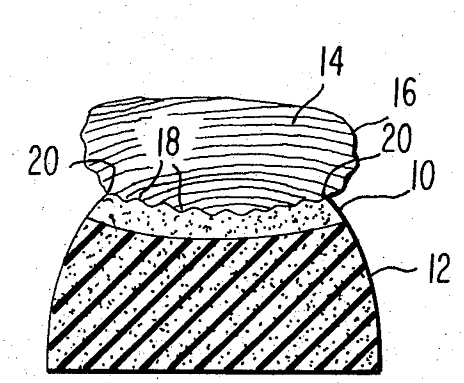
FIG. 1 is an elevation view partly in cross section of a device for storing the ridge pattern of a fingerprint impressed thereon.

In FIG. 1, a shape retentive material is illustrated as a relatively thin layer of silicon putty 10, which is bonded to a relatively thick resilient material 12, such as a foam rubber pad. A finger 14, having on its outer skin layer 16 (known medically as the epidermus) a ridge pattern or fingerprint 18, is pressed against the silicon putty 10. The ridge pattern 18 from finger 14 is impressed on silicon putty layer 10 to be stored thereby. Foam rubber 12 permits people to use different amounts of pressure in impressing the fingerprint pattern on the silicon putty layer 10, while producing approximately consistent depressions. Also, the resilient rubber permits the finger to be "cradled" in the shape retentive material allowing ridges 20 at the sides of the finger 14 to be stored by the silicon putty 10.

Silicon putty 10 is only an example of material suitable for storing the fingerprint. Any material which can three-dimensionally record and hold the ridges of a fingerprint is suitable. It is also desirable that the material be erasable so that a new fingerprint may be recorded without replacing the shape retentive material after each use.

Figure 2:
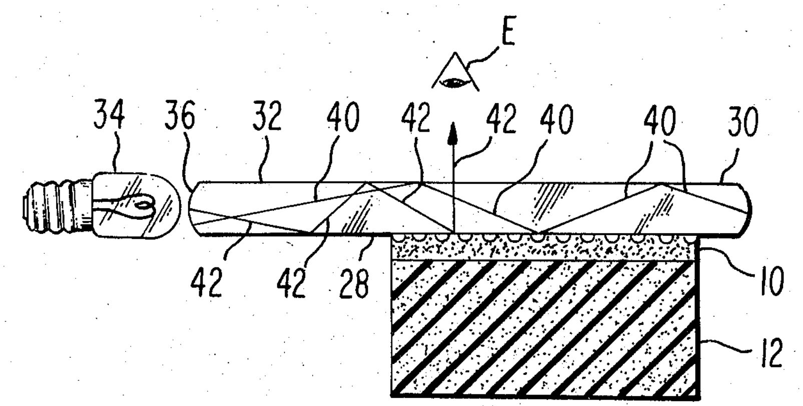
FIG. 2 is an elevation view partly in cross section of apparatus for visually displaying the ridge pattern of a fingerprint utilizing the device of FIG. 1.

In FIG. 2, silicon putty 10 on the foam rubber pad 12 bearing the ridge pattern of finger 14 is placed against one planar surface 28 of a transparent material 30, such as a glass plate. Transparent material 30 may be any material capable of substantially totally internally reflecting light applied thereto. Such materials which have an index of refraction on the order of 1.5 or greater include glass, lucite, sapphire, and diamond. Of the enumerated materials, glass is probably the best, as it is relatively inexpensive, readily available, and unlikely to be scratched with normal use.

Glass plate 30 comprises two planar parallel surfaces 28 and 32. Light from a suitable illuminating source 34, such as a light bulb, is applied at one edge 36 of the glass plate 30. This light is normally internally reflected as indicated by zig-zag line 40. However, at any location along the surface 28, where a substance having a different index of refraction from that of glass plate 30, such as silicon putty 10, is in contact therewith light rays striking the glass and silicon putty interface are reflected out of the glass along the opposite face as illustrated by zig-zag line 42. Thus, each place a raised portion of silicon putty 10, corresponding to a depressed portion of a fingerprint from finger 14, touches the glass plate 30, light is reflected upward to opposite surface 32. In all other regions, the glass appears dark. The contrast may be improved if glass plate 30 is surrounded by a dark enclosure (not illustrated), which exposes only surface 32 of the glass plate.

Figure 3:
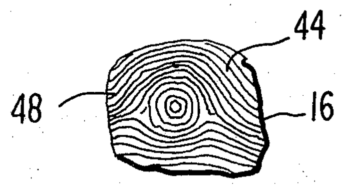
FIG. 3 is an illustration of a fingerprint being displayed on the apparatus of FIG. 2.

FIG. 3 shows a finger print as viewed on surface 32 of glass plate 30. The while lines, such as line 44, corespond to raised portions on silicon putty 10, which correspond to depressed areas on the skin. The black areas, such as lines 48, correspond to depressed areas on silicon putty 10.

In operation, a finger 14, having a fingerprint to be visually observed, is pressed down on silicon putty 10 as illustrated on FIG. 1, the silicon putty thereafter retaining the ridge pattern of finger 14. The silicon putty is next placed under glass plate 30 and illuminated by illuminating source 34. The fingerprint may be visually displayed on surface 32 to an observer located at E. The print, as displayed in FIG. 3, may be compared by an operator with a photograph of a print which, for example, may be part of a credit card. Alternatively, the fingerprint, as appearing on the surface 32, may be photographed.

The silicon putty layer 10 may next be erased by pushing a flat surface of any suitable material against the putty and applying pressure. Thereafter, a new fingerprint may be stored on the silicon putty 10 for display as above described. Alternatively, a new fingerprint may be superimposed over the old fingerprint on silicon putty 10, thereby effectively erasing the old fingerprint. While glass plate 30 has been described as having two parallel planar surfaces, it may, in fact, have differently shaped surfaces 28 and 30, if a distortion of the fingerprint image is permissible or desirable. Thus, for example, surfaces 28 and 32 may be shaped such as to provide a magnifying action so as to create a larger image appearing on surface 32 than is the size of the fingerprint impressed on silicon putty 10.

What is claimed is:

1. Apparatus for optically displaying a ridge pattern comprising, in combination:

a member of transparent material structured so that diffuse light energy applied to said member is normally, substantially totally reflected internally between adjacent surfaces of said member;

means having stored on a surface thereof the raised ridge pattern to be displayed placable with the raised ridges of said pattern in contact with one of said surfaces of said member;

the presence of said ridges in contact with said one surface causing said light energy to be reflected externally of said member at points on a second surface of said member determined according to the location of said ridges on said one surface; and means for applying said diffuse light energy to said member.

2. Apparatus as claimed in claim 1, said one surface and said second surface of said member being planar and parallel to one another, said light energy being applied by said last-mentioned means at an edge of said member between said one and second surfaces.

3. Apparatus for visually displaying a fingerprint comprising, in combination:

a member of transparent material structured so that diffuse light energy applied to said member is normally, substantially totally reflected internally between surfaces of said member;

means having erasably stored on a surface thereof the raised ridge pattern of said fingerprint to be displayed placable with the raised ridges of said pattern in contact with one of said surfaces of said member;

the presence of said ridges in contact with said one surface causing said light energy to be reflected externally of said member at points on a second surface of said member determined according to the location of said ridges on said one surface; and means for applying said diffuse light energy to said member.

4. Apparatus as claimed in claim 3, said one surface and said second surface of said member being planar and parallel to one another, said light energy being applied by said last-mentioned means at an edge of said member between said one and second surfaces.

5. Apparatus as claimed in claim 3, said pattern storing means including an erasable shape retentive material which may be erased and reused after a stored ridge pattern has been displayed.

6. Apparatus as claimed in claim 5, said shape retentive material being silicon putty and further including a resilient material backing to which said silicon putty is mounted.

7. Apparatus as claimed in claim 3, said member of transparent material being a glass plate.

8. A method of displaying a ridge pattern of a portion of the skin comprising the steps of:

a. applying the portion of the skin having the ridge pattern to be displayed to a deformable shape retentive material thereby creating on a surface of said material a three-dimensional raised ridge pattern:

b. placing the surface of said shape retentive material bearing said ridge pattern against one side of a transparent material having two parallel planar sides so that said raised ridges touch said transparent material, said transparent material substantially totally internally reflecting diffuse light applied thereto except where said raised ridges touch said one side of said transparent material whereat said light is reflected externally of said material from the other side; and c. diffusely illuminating said transparent material to thereby produce a visual image of said ridge pattern at said other side of said transparent material.

9. The method set forth in claim 8, wherein said shape retentive material is erasable, including the further step of erasing the skin ridge pattern from said shape retentive material after said pattern has been visually displayed.

* * * * *